United States Patent

Taira

[11] Patent Number: 6,137,624
[45] Date of Patent: Oct. 24, 2000

[54] NONLINEAR OPTICAL WAVELENGTH CONVERTING DEVICE

[75] Inventor: Yoichi Taira, Tokyo, Japan

[73] Assignee: International Business Machines Corporation, Armonk, N.Y.

[21] Appl. No.: 08/683,739

[22] Filed: Sep. 9, 1996

Related U.S. Application Data

[63] Continuation of application No. 08/324,080, Oct. 14, 1994, abandoned.

[30] Foreign Application Priority Data

Oct. 19, 1993 [JP] Japan .................................. 5-260922

[51] Int. Cl.$^7$ .................................................. G02F 1/35
[52] U.S. Cl. .................................................. 359/326
[58] Field of Search ................... 385/122; 359/326–332; 372/21, 22

[56] References Cited

U.S. PATENT DOCUMENTS

| | | | |
|---|---|---|---|
| 3,619,637 | 11/1971 | Goto | 359/328 |
| 4,510,402 | 4/1985 | Summers et al. | 359/329 |
| 5,047,668 | 9/1991 | Bosenberg | 359/330 |
| 5,247,389 | 9/1993 | Beausoleil | 359/326 |
| 5,315,433 | 5/1994 | Okazaki et al. | 359/328 |

FOREIGN PATENT DOCUMENTS 6265950  9/1994  Japan ................................ G02F 1/37

OTHER PUBLICATIONS

Samanta, L. K. et a., "Technique for Enhanced Second Harmonic Output Power", Optics Communications, Vol. 76, No. 3,4, May 1, 1990, pp. 250–252.

*Primary Examiner*—John D. Lee
*Attorney, Agent, or Firm*—Robert B. Martin

[57] ABSTRACT

The present invention is a wavelength converting device comprising a plurality of nonlinear optical crystals for transmitting light by second harmonic generation. Each crystal piece has a crystal axis respectively and is positioned with the crystal angle satisfying a phase matching condition for second harmonic generation and so that the adjacent crystal axis is oriented in a crystallographically different way. In one embodiment, the acceptance angle $\phi$ in the insensitive direction becomes the same as the acceptance angle $\theta$ in the sensitive direction. Therefore, there is no need for gathering light to an oval shape, and maximum conversion efficiency can be obtained by gathering light with a conventional spherical lens.

1 Claim, 7 Drawing Sheets

NONLINEAR OPTICAL WAVELENGTH CONVERTING DEVICE

This is a continuation of application Ser. No. 08/324,080 filed on Oct. 14, 1994 (abandoned).

FIELD OF THE INVENTION

The present invention relates to a wavelength converting device, and more specifically to a wavelength converting device that extracts light, as the emitting light, converted to a predetermined wavelength from the oscillating wavelength of the incident light by a non-linear optical effect.

BACKGROUND OF THE INVENTION

There have been wavelength converting devices that obtain ultraviolet rays of converted wavelength from the fundamental continuous visible laser beam by converting the wavelength using non-linear optical materials, such as uniaxial crystal, having optical anisotropy (non-linear optical effect). For example, it has been common practice to convert the wavelength of the light from second harmonic generation (SHG) using non-linear optical materials such as β-barium borate (BBO).

In the wavelength conversion of light from SHG, various non-linear optical materials are used depending on the wavelength and power of the incident light. This is because of the necessity of satisfying the phase matching condition as well as the requirement to use non-linear optical materials with greater effectiveness.

For the sake of simplicity, the following explanation of the wavelength conversion uses the case of SHG. However, the situation is the same in sum frequency generation and difference frequency generation. When the incident light consists of two wavelength components, the wavelength of the emitting light is the sum of both in the former generation, while it is the difference between them in the latter generation.

Once the non-linear optical materials to be used and the wavelength of the incident light are decided for obtaining SHG light with the desired wavelength, the maximum wavelength conversion efficiency factor γ is derived, and the light power P2 for the new wavelength resulting from the conversion is expressed on the basis of incident power P1 as the following equation (1).

$$P2 = \gamma \cdot P1^2$$

The above equation, however, is applicable only when P2 is sufficiently small compared to P1; as P2 approaches P1, the actual light power has a smaller value than P2. In addition, the above equation is valid only on the condition that the crystal is not damaged by the light power. It is known that the crystal length does not affect the upper limit value of the wavelength conversion efficiency factor γ, this is changed by only alteration of the most suitable condition for gathering light (D. Eimerl, et al.: "Optical, mechanical, and thermal properties of barium borate", Journal of Applied Physics, 62 (1987) pp. 1968–1983).

When the incident light power is small, however, the light power at the converted wavelength is weak and often insufficient with the conversion efficiency factor obtained in this way. When non-linear optical materials are used for SHG, the condition for gathering the light is generally such that the convergence angle of the fundamental light nearly equals the acceptance angle (incident angle making wavelength conversion efficiency factor γ maximum) determined by the phase matching condition of the non-linear optical materials.

In the case of critical phasematching (angle phase matching), however, there is considerable anisotropy in the acceptance angle; for example, meridional and sagittal directions differ in acceptance angles. Therefore, the most suitable condition for gathering light requires an elliptic shape of focus that is gathered by a cylindrical lens or the like. This matches the gathering condition to the direction of the smaller acceptance angle; therefore gathering light strongly to the non-linear optical materials with a large incident angle by a so-called spherical lens system. That is, it is impossible to improve the wavelength conversion efficiency by altering the light gathering condition.

On the contrary, in the case of non-critical phasematching (called 90° phasematching condition under certain conditions), the acceptance angle is large and has little anisotropy; therefore, it is possible to gather light strongly to the non-linear optical materials by using a lens system, making it possible to obtain maximum wavelength conversion efficiency by altering the light gathering condition.

In this way, a difference in the maximum conversion efficiency between non-critical and critical phasematching conditions (are proportional to) results from the ratio of acceptance solid angles in the respective conditions. Thus, by means of non-critical phasematching which possibly attain maximum wavelength conversion efficiency, it becomes possible to form a wavelength converting device for SHG with maximum wavelength conversion efficiency factor γ.

However, there have been no non-linear optical materials that satisfy the non-critical phasematching condition at optional wavelength desired for SHG; consequently, it must rely on critical phasematching to convert to the light having the wavelength that results in the desired SHG. For this reason, it is difficult to improve the wavelength conversion efficiency by changing the light gathering condition when the incident light has low power.

For the purpose of improving the efficiency with a single element, it might be possible to solve this problem by employing an optical waveguide by which light propagates for a long distance without diffusion; however, it is difficult to apply an optical waveguide to light of high power and it can also be difficult, depending on the material, to construct optical waveguide.

The present invention aims, in view of this situation, to provide a wavelength converting device that can improve wavelength conversion efficiency under the critical phasematching condition.

SUMMARY OF THE INVENTION

The wavelength converting device according to the present invention is one in which a plurality of non-linear optical materials, which exhibit optical anisotropy and emit incident light of a basic wavelength with light of at least one conversion wavelength different than said basic wavelength, are disposed so as to be directed in a crystallographic orientation in order to satisfy a phase matching condition along the respective directions in which the transmitted light travels, and in which at least two of said non-linear optical materials are disposed so that planes including crystal axes are the same and so that said crystal axes are directed such that their orientations are crystallographically different.

This wavelength converting device may, as described in claim 2, further comprise adjusting means for adjusting the phase matching condition by independently adjusting respective directions of said crystal axes of said non-linear optical materials and adjustment of the phase matching condition by adjusting at least one of pressure, temperature and electric field applied uniformly to said plurality of non-linear optical materials.

DETAILED DESCRIPTION OF THE INVENTION

The wavelength converting device according to the present invention comprises a plurality of non-linear optical materials which exhibit optical anisotropy and emit incident light of a basic wavelength and light of at least one conversion wavelength different than said basic wavelength. The non-linear optical materials may be non-linear optical uniaxial or biaxial crystals and include, for example, those in which a wavelength zone of visible rays or near infrared rays is used as the incident light such as BBO, KDP ($KH_2PO_4$), ADP ($NH_4H_2PO_4$), $LiNbO_3$, and $Ba_2NaNb_5O_{15}$, and those in which a wavelength zone of infrared rays is used as the incident light such as CdSe, Se and Te. These non-linear optical materials have crystal axes.

The present invention utilizes polarization of the incident light with predetermined wavelength such as a laser beam, and the non-linear optical effect due to the non-linear characteristic of the electric field such as SHG and third harmonic generation. Non-linear optical materials, such as crystals, that have optical anisotropy generate two refractive lights by double refraction when light enters: uniaxial crystals generate ordinary rays and extraordinary rays, while biaxial crystals generate two sorts of light, both of which behave like extraordinary rays. The wavelength of one extraordinary ray becomes the wavelength of the converted light that emits from the incident light. There are accompanying electro-optical, magneto-optical, and photoelastical optical effects besides the aforementioned non-linear optical effect.

When the wavelength is converted from the incident light wavelength to the wavelength of the emitting light with the non-linear optical materials, it is necessary to match the phases making, for example, the angle of the crystal axis most suitable for the incident light depending on the correspondence between the incident light wavelength and converted wavelength of the emitting light. For this purpose, each of a plurality of non-linear optical materials is disposed so as to be directed in a crystallographic orientation so as to satisfy a phase matching condition along directions in which the respective transmitted light travels. In addition, at least two of a plurality of non-linear optical materials are disposed so that their planes including crystal axes are the same and so that said crystal axes are directed such that their orientations are crystallographically different. In this way, the non-linear optical materials disposed in different orientations become inverted crystallographically while the phase matching condition is maintained. The light propagates in the non-linear optical material that is on the downflow side of the light direction, in the direction that makes the walk-off disappear (diminishing the region where ordinary rays superimpose extraordinary rays in the case of uniaxial crystals), which walk-off occurs in the upflow non-linear optical materials. Thus, the wavelength conversion efficiency is improved even though the length of the non-linear optical materials, such as crystals, is the same.

Adjacent non-linear optical materials are preferably disposed so that their crystal axes alternately direct differently. In the case of biaxial crystals, the disposition may be such that the planes including the axes are the same, which axes correspond to the wavelength conversion from the incident light wavelength to the converted wavelength of the emitting light.

The angle of crystal axes is made most suitable for the incident light according to the correspondence between the wavelength of the incident light and the converted wavelength of the emitting light by, as described in claim 2, adjusting means for adjusting the phase matching condition by independently adjusting the directions of the crystal axes of the non-linear optical materials. Adjusting means for the phase matching condition may be further provided by adjusting at least one of pressure, temperature and electric fields applied uniformly to the plurality of non-linear optical materials.

DESCRIPTION OF THE PREFERRED EMBODIMENT

An embodiment of the present invention is explained hereunder in detail with reference to the accompanying drawings. This embodiment is explained as an application example of the present invention for a case where SHG (which generates double wave) is obtained from light of about 500 nm through type 1 phasematching of critical phasematching by BBO crystals.

Figure 1:
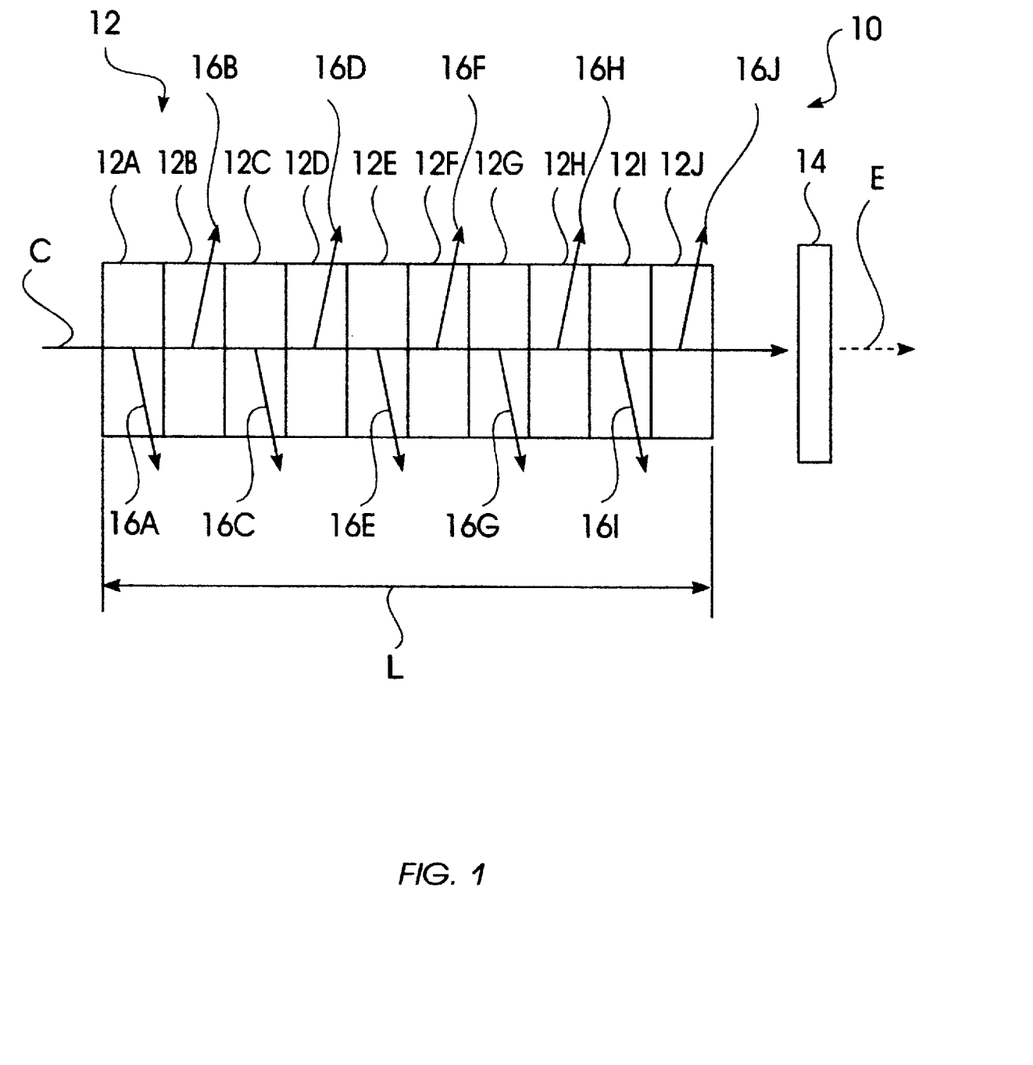
FIG. 1 is a schematic view of the composition of the wavelength converting device according to an embodiment of the present invention.

As shown in FIG. 1, light C is emitted from a light source (not shown) of variable wavelength type (e.g., a laser) and is shone into wavelength converting device 10. Wavelength converting device 10 is composed of BBO crystal 12, of length L along the propagation direction, and filter 14. Filter 14 is provided for transmitting only light E of predetermined wavelength that is a SHG product and is converted by BBO crystal 12.

Figure 3:
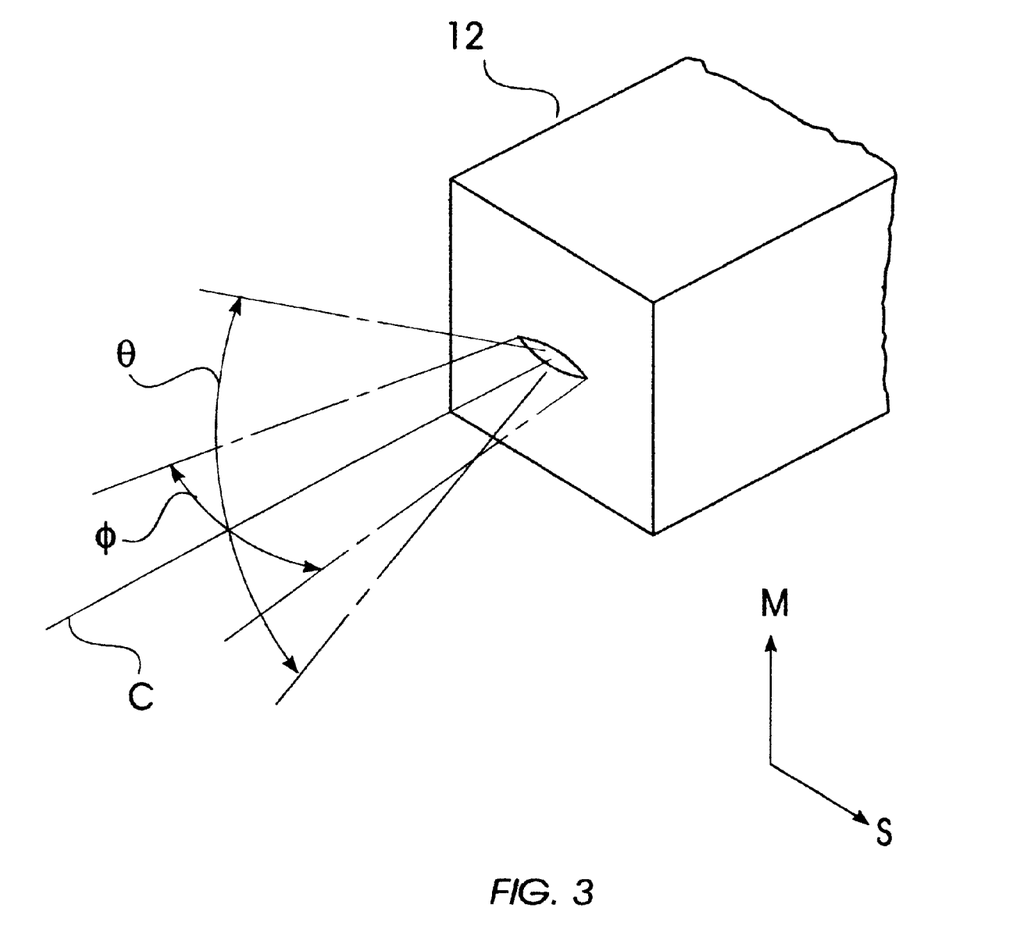
FIG. 3 is a schematic view for explaining acceptance angles in a BBO crystal.

BBO crystal 12 is of the critical phasematching type; the acceptance angle with reference to the radiating light axis C is angle θ in the sensitive direction (in FIG. 3, meridional direction M) and angle φ in the insensitive direction (in FIG. 3, sagittal direction S) where θ differs from φ (see FIG. 3; about 10 times). The acceptance angle is inversely proportional to the crystal length, the acceptance angle becomes larger as the length is made shorter.

BBO crystal 12 according to the present embodiment is composed of 10 crystal pieces 12A, 12B, 12C, 12D, 12E, 12F, 12G, 12H, 12I, and 12J, equally divided in parallel planes along the propagating direction of the light so that the crystal axes have an angle that satisfies the phase matching condition for SHG when the incident light is nearly perpendicular. The BBO crystal 12 of length L consists of these crystal pieces 12A–12J.

Each crystal pieces 12A–12J has a crystal axis 16A–16J respectively, crystal axes of adjacent crystal pieces are disposed so as to have different crystallographic orientation. That is, the crystal pieces are so arranged that the crystal orientation turns 180°, orienting crystal pieces 12A–12J respectively toward the phase matching direction.

Figure 4:
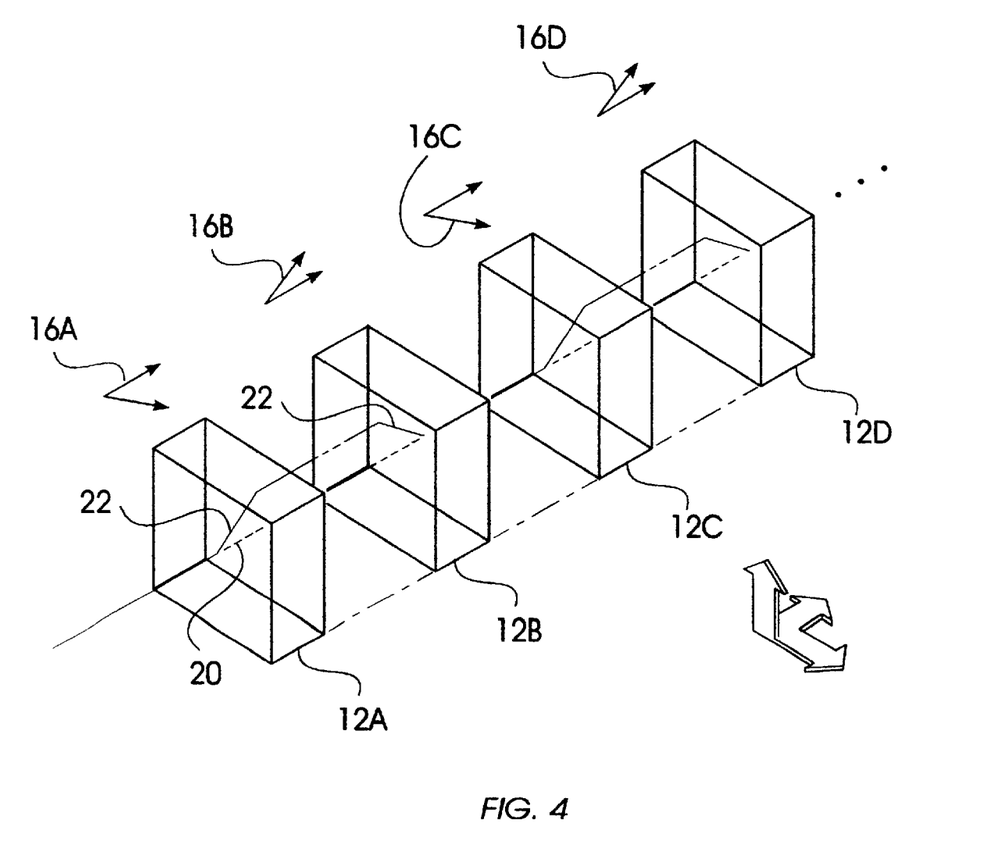
FIG. 4 is a schematic view for explaining the disposition of crystal pieces constituting a BBO crystal.

In detail, each crystal piece 12A–12J is first disposed so as to have the axis angle with respect to the incident light axis satisfy the phase matching condition for SHG. In crystal pieces 12A–12J, as shown in FIG. 4, an ordinary ray 20 propagates straight with angle of refraction of 0° according to the law of refraction, as is well known, since it has no dependence on the angle to the crystal axis in the crystal piece 12A, for example, while extraordinary ray 22 propagates with a predetermined angle of refraction, not obeying the law of refraction. Crystal piece 12B adjacent to crystal piece 12A is placed in a crystallographically different orientation; therefore, extraordinary ray 22 propagates with an angle of refraction symmetric to the predetermined angle of refraction in crystal pieces 12A with respect to the axis of ordinary ray 20. For crystal pieces 12C through 12J, the disposition of respective crystal pieces is so made that the travel direction of extraordinary ray 22 penetrating the adjacent upflow crystal piece differs. Thus, each of crystal pieces 12A–12J is disposed alternately so that the crystal axis is oriented in a crystallographically different way.

Figure 2:
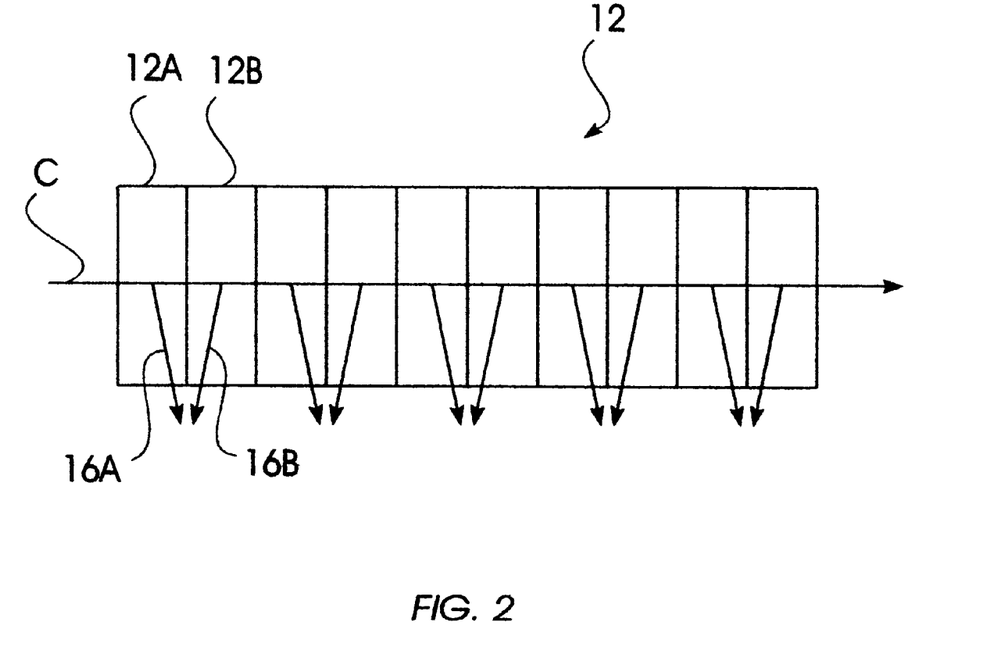
FIG. 2 is a schematic view of another example of a BBO crystal in the wavelength converting device.

FIG. 2 shows another disposition of crystallographically different orientation.

Figure 5:
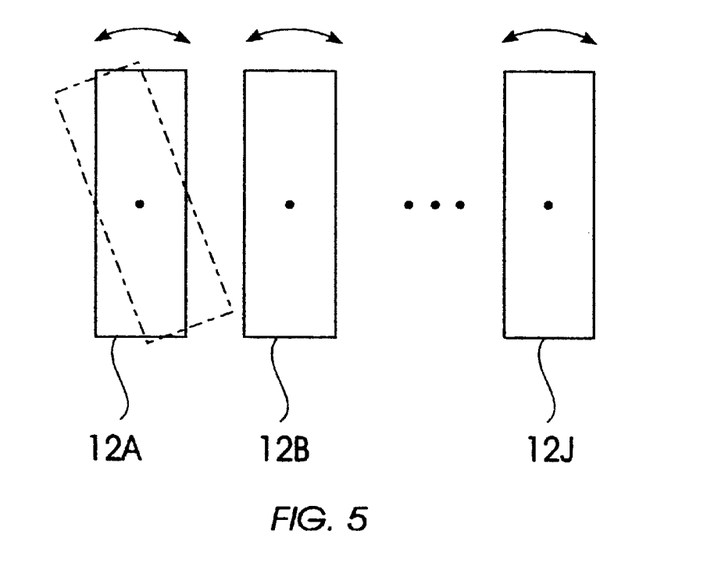
FIG. 5 is a schematic view for explaining the adjustment of the phase matching condition by adjusting the angles of crystal axes.

While each crystal piece 12A–12J is supposed to have a crystal axis angle satisfying the phase matching condition for SHG in the above explanation. Fine tuning is required for each of crystal pieces 12A–12J in order to improve the conversion efficiency, overcoming error in shape and dimension. It is therefore preferable to fine tune the angle for each crystal piece independently as shown in FIG. 5; thereby making angle adjustment possible when selecting the wavelength conversion.

Figure 6:
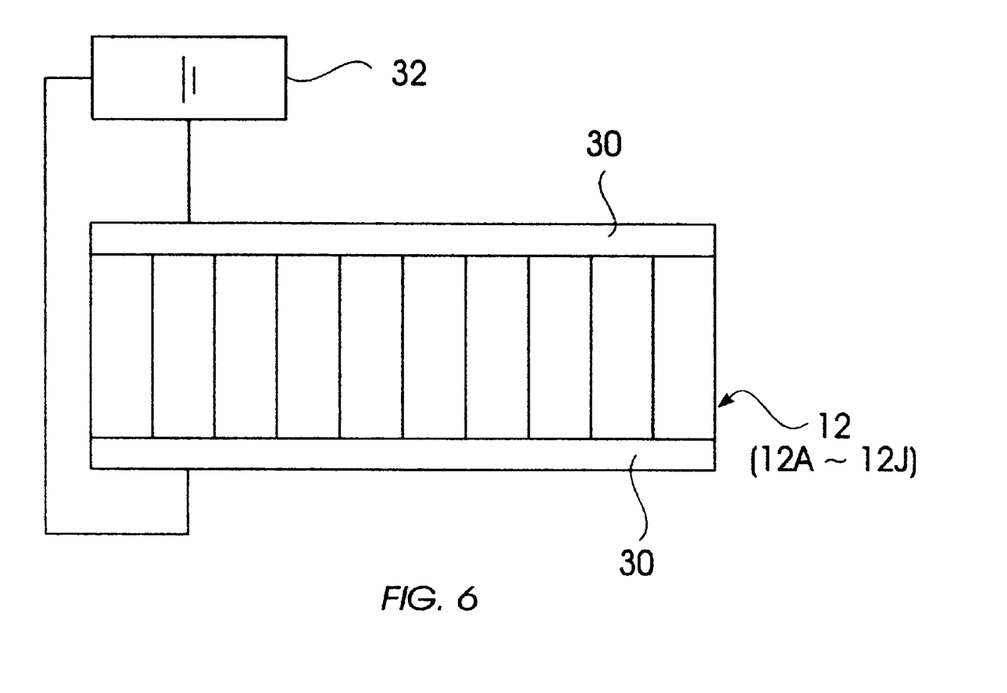
FIG. 6 is a schematic view for explaining the adjustment of phase matching condition by adjusting the electric field applied to a BBO crystal.

While adjustment of the phase matching condition is explained in above embodiment for the case where independent angle adjustment is made for respective crystal pieces, the phase matching condition is not limited to the angle adjustment. The phase matching condition may be adjusted by adjusting at least one of pressure, temperature and electric fields applied uniformly to respective BBO crystals mentioned above. When the phase matching condition is adjusted by an electric field, each crystal piece 12A–12J is placed with an angle satisfying the phase matching condition for predetermined SHG, and electrodes 30 insert and hold each crystal piece 12A–12J so that a uniform electric field is applied to each crystal piece 12A–12J. Electrodes 30 are connected to an electrical field generator 32; accordingly, the phase matching condition can be adjusted by applying a predetermined electric field to BBO crystal 12 by electrical field generator 32. The electric field may be applied independently to each crystal piece 12A–12J.

Figure 7:
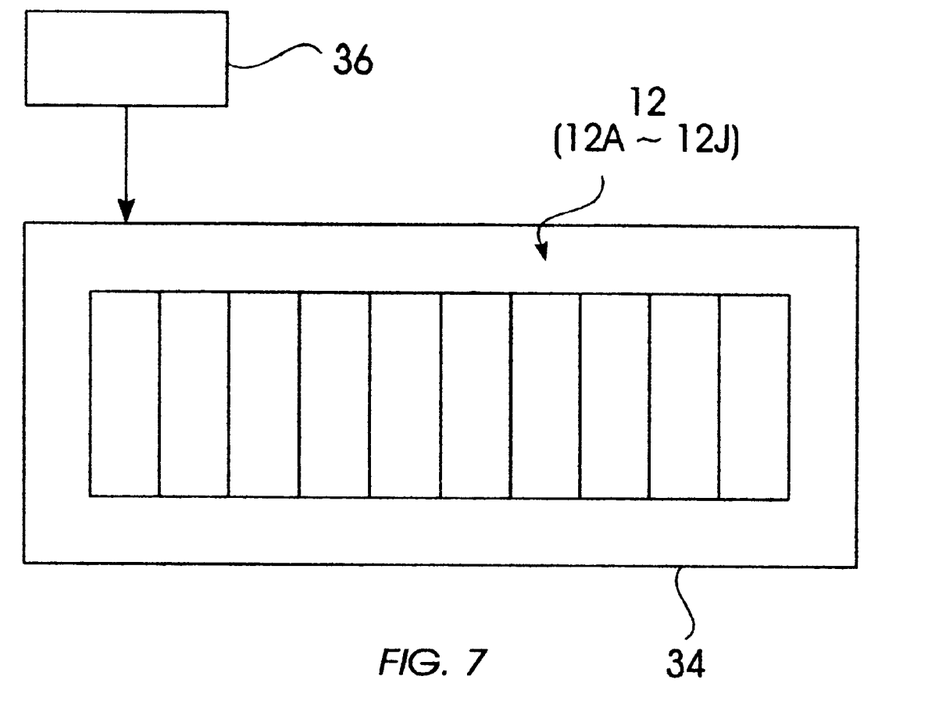
FIG. 7 is a schematic view for explaining the adjustment of phase matching condition by adjusting the pressure or temperature applied to a BBO crystal.

When the phase matching condition adjustment is made by pressure or temperature, each crystal piece 12A–12J is arranged with an angle satisfying the phase matching condition for predetermined SHG as shown in FIG. 7 so that the angle should not be changed. BBO crystal 12, comprising crystal pieces 12A–12J, is covered by box 34; the internal pressure or temperature of box 34 can be changed by a condition adjusting device 36 such as a pressure and vacuum apparatus or a heating and cooling apparatus. Uniform pressure or temperature is applied to each crystal piece 12A–12J controlled for the phase matching condition by adjusting the internal pressure or temperature of box 34 by means of condition adjusting device 36. The pressure or temperature may be applied independently to each crystal piece 12A–12J.

The operation of wavelength converting device 10 of the present embodiment is explained below. First, the inventor noted that efficiency of wavelength conversion is not improved only by increasing the crystal length and found a key to improvement in the fact that the efficiency of wavelength conversion is reduced by walk-off, a phenomenon diminishing the region where ordinary rays and extraordinary rays are superimposed inside a crystal. In BBO crystal 12 of the present embodiment, the acceptance angle in the sensitive direction is influenced markedly by walk-off and related phenomena. Therefore, the BBO crystal of predetermined length L is divided, in the present embodiment as explained, to inhibit walk-off for the purpose of improving the target of wavelength conversion efficiency in the BBO crystal of predetermined length L.

Figure 8:
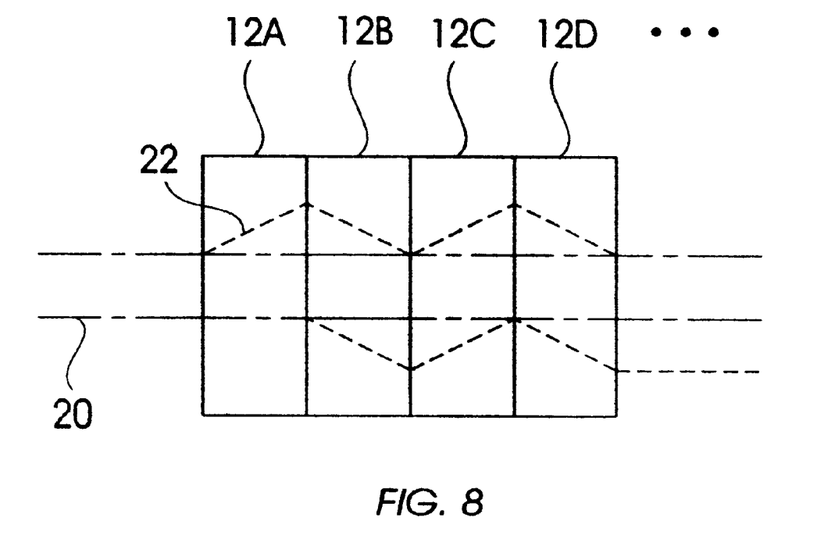
FIG. 8 is a schematic view for explaining walk-off in a BBO crystal.

That is, fundamental light C at a nearly perpendicular angle of incidence comprises ordinary ray 20 that propagates straight with an angle of refraction of 0°, and extraordinary ray 22 that propagates with predetermined angle of refraction in crystal piece 12A, as shown in FIG. 8. Since crystal piece 12A is one of ten equally divided in the length, walk-off does not develop noticeably and the emitting light comprises the ray by SHG from the extraordinary ray. While crystal piece 12B is adjacent to crystal piece 12A, crystallographic orientation of crystal axis 16B of crystal piece 12B is so disposed as to differ from that of crystal axis 16A of crystal piece 12A (see FIG. 1). Therefore, the emitted light from crystal piece 12A falls on crystal piece 12B nearly perpendicularly; inside crystal piece 12B, ordinary ray 20 propagates straight with an angle of refraction of 0°, and extraordinary ray 22 propagates with predetermined angle of refraction, which angle is opposite in direction to the propagation of extraordinary ray 22 in crystal piece 12A. Accordingly, the decrease in the region of superimposition of ordinary and extraordinary rays inside crystal pieces 12A and 12B becomes minimal. In this way, each crystal piece 12C, 12D, 12E, 12F, 12G, 12H, 12I, and 12J is disposed so that the crystallographic orientation differs from that of the emitting side's crystal; therefore, the superimposed region of ordinary and extraordinary rays does not decrease by continuation of the combined crystal pieces, and walk-off does not increase.

In BBO crystal 12 of the present embodiment, acceptance angle $\theta$ in the sensitive direction is approximately 10 times as large as acceptance angle $\phi$ in the insensitive direction. Since the acceptance angles are inversely proportional to the length of BBO crystal 12, acceptance angles $\theta$ and $\phi$ become 10 times larger in each of crystal pieces 12A–12J that are divided equally into 10 pieces. Five adjacent combination pairs (crystal pieces 12A, 12B), (crystal pieces 12C, 12D), (crystal pieces 12E, 12F), (crystal pieces 12G, 12H), and (crystal pieces 12I, 12J) with different crystal orientations are considered next.

For the combination of crystal pieces 12A and 12B, each crystal piece has a different crystallographic orientation; therefore, the acceptance angle $\theta$ in the sensitive direction is maintained the same since the walk-off explained above is small compared to acceptance angles θ and φ of crystal piece 12A only, while acceptance angle φ in the insensitive direction becomes ½ (inversely proportional to the length) since the direction in which walk-off occurs is different.

In the combination of crystal pieces 12A and 12B, the length is doubled compared with the length of crystal piece 12A alone; therefore, the power of light by SHG that is the emitting light becomes 4 times as large, as explained by the prior art (see equation (1)). Thus, the light power by SHG by the combination of crystal pieces 12A and 12B becomes twice as large as the light power by a single BBO crystal with a length of 2L/10 corresponding to the combined length of crystal pieces 12A and 12B. In this way, the light power by SHG is proportional to the length of the crystal.

For the combinations of crystal pieces 12C and 12D, crystal pieces 12E and 12F, crystal pieces 12G and 12H, and crystal pieces 12I and 12J also, the acceptance angle θ in the sensitive direction is the same, the acceptance angle φ in the insensitive direction is ½, and the light power by SHG is twice as large as the light power by single BBO crystal (length: 2L/10) since the composition of respective combinations is the same as the combination of crystal pieces 12A and 12B.

In this way, the continuation of crystal pieces, making adjacent crystal pieces differ in crystallographic orientation, provides: the same acceptance angle θ in the sensitive direction, a acceptance angle φ in the insensitive direction that is inversely proportional to the length of the crystal, and light power by SHG that is proportionate to the combined crystal length compared to acceptance angles θ and φ of a single crystal piece.

Figure 9:
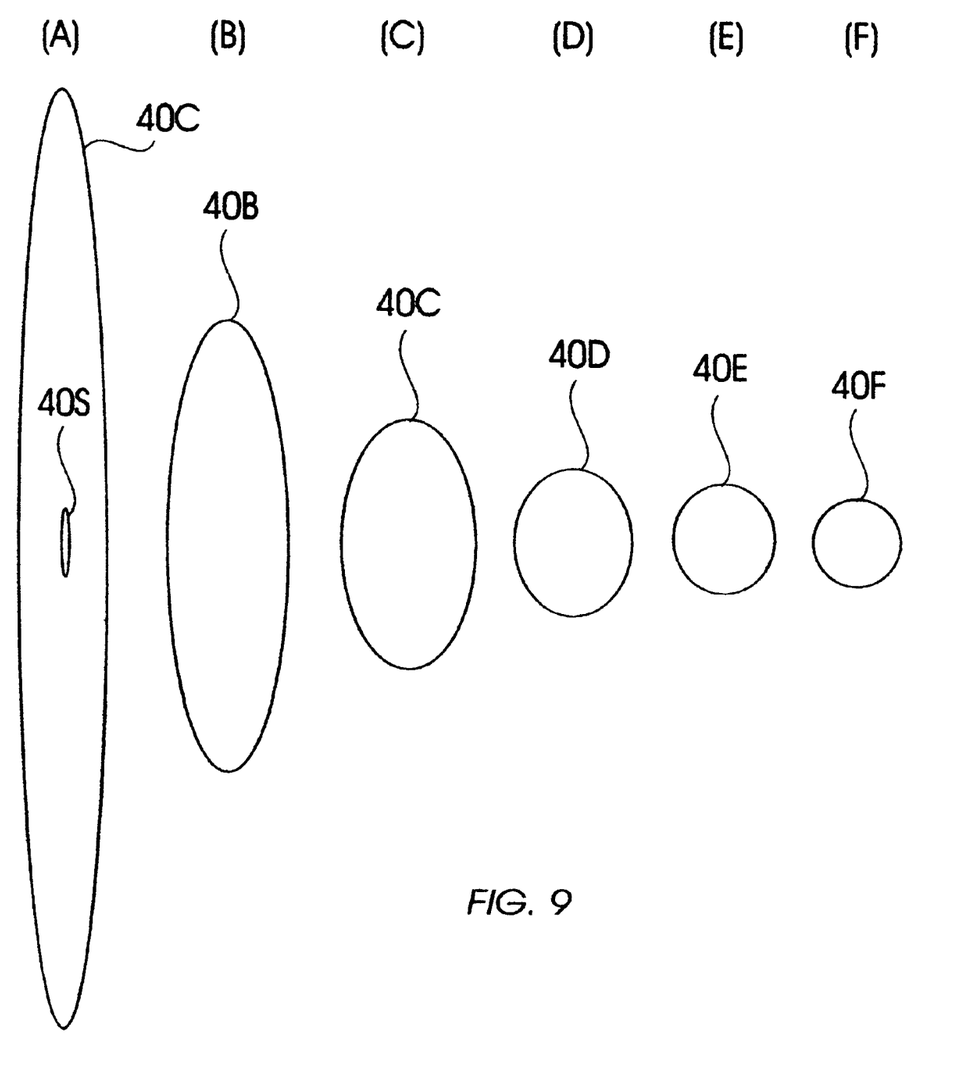
FIG. 9 is a schematic view for explaining the shapes of focus when combination of crystal pieces is continued.

Therefore, while focus shape 40A corresponding to the acceptance angle for the case of crystal piece 12A only becomes 10 times as large as focus shape 40S in the case of BBO crystal of length L as shown in FIG. 9 (A), the combination of crystal pieces 12A and 12B makes its focus shape 40B as shown in FIG. 9 (B) reflecting the facts that the acceptance angle in the sensitive direction is maintained the same and that the acceptance angle in the insensitive direction is inversely proportional to the length of the crystal, which is ½. In this way, while the acceptance angle in the sensitive direction is maintained the same, the acceptance angle in the insensitive direction becomes: ¼ (see FIG. 9 (C)) when crystal pieces 12C and 12D are further continued, ⅙ (see FIG. 9 (D)) when crystal pieces 12E and 12F are further continued, ⅛ (see FIG. 9 (E)) when crystal pieces 12G and 12H are further continued, and 1/10 (see FIG. 9 (F)) when crystal pieces 12I and 12J are further continued.

Thus, BBO crystal 12 of length L comprising crystal pieces 12A–12J in combination has, compared with single BBO crystal 12 of length L, the same acceptance angle φ in the insensitive direction, and acceptance angle θ in the sensitive direction 10 times as large: acceptance angle φ in the insensitive direction becomes equal to acceptance angle θ in the sensitive direction. In addition, the light power by SHG, which is the output of filter 14, becomes 10 times as strong since the length L is the same as the singly composed BBO crystal.

According to the present embodiment as explained hereinabove, the acceptance angle φ in the insensitive direction becomes the same as acceptance angle θ in the sensitive direction; therefore, there is no necessity for consideration of the light gathering condition at critical phasematching as is the case with gathering light to an oval shape. The circular light gathering condition is enough, as is that of crystals at non-critical phasematching. Thus, even with a wavelength converting device using non-linear optical materials at the critical phasematching condition, the efficiency decrease in the critical phasematching condition due to walk-off can be prevented and maximum conversion efficiency can be obtained by gathering light with a conventional spherical lens.

The wavelength converting device according to the present embodiment is effective in wavelength conversion from a laser beam of 850 nm wavelength as the fundamental light source to a laser beam of 430 nm wavelength that is used for recording optical discs, and in the wavelength conversion from a laser beam of 500 nm wavelength as the fundamental light source to a laser beam of 250 nm wavelength that is used for lithography.

According to the present invention as explained above, at least a pair of non-linear optical materials are disposed so that their crystal axes are differently directed crystallographically; therefore, it is advantageous in that the wavelength conversion efficiency can be easily improved even under the critical phasematching condition.

What is claimed is:

1. A wavelength converting device in which a plurality of non-linear optical materials, which exhibit optical anisotropy and emit incident light of a basic wavelength with light of at least one conversion wavelength different from said basic wavelength, disposed so as to be directed in a crystallographic orientation in order to satisfy a phase matching condition along the respective directions in which the transmitted light travels, and in which at least two of said non-linear optical materials are disposed so that (i) the crystal orientation turns 180°; (ii) the planes including crystal axes being equal and (iii) so that said crystal axes are directed such that their orientations are crystallographically different, the converting device also comprising adjusting means for adjusting the phase matching condition by adjusting at least one of pressure, temperature and electric field applied uniformly to said plurality of non-linear optical materials.

* * * * *